Dec. 4, 1928.  1,694,063

H. J. HINDE

SHAFT CONTROL MEANS FOR DRAWING AND STAMPING PRESSES

Filed Oct. 19, 1927

Inventor

Henry J. Hinde

By Owen & Owen

Attorneys

Patented Dec. 4, 1928.

1,694,063

UNITED STATES PATENT OFFICE.

HENRY J. HINDE, OF TOLEDO, OHIO, ASSIGNOR TO THE TOLEDO MACHINE & TOOL COMPANY, OF TOLEDO, OHIO, A CORPORATION OF OHIO.

SHAFT-CONTROL MEANS FOR DRAWING AND STAMPING PRESSES.

Application filed October 19, 1927. Serial No. 227,125.

This invention relates to stamping and drawing presses, but particularly to presses of the type employing friction clutches and brakes.

Heretofore considerable difficulty has been experienced in the operation of clutches commonly used on stamping and drawing presses. These clutches are of the friction disk type embodying a drum encircling the disks and against which a friction band or shoe bears to serve as a brake for stopping the rotation of the parts. It has been found that the heat generated by the braking element is sufficiently great to interfere with the normal and efficient operation of the clutch, it being found that the brake lining is burned out after a short time. To overcome this objection, it is not unusual for press operators to direct a continuous blast of air against the outside of the clutch, but obviously this procedure is expensive and impractical. It is a desideratum that a friction clutch and brake be produced which will operate satisfactorily and efficiently over an extended period of time without generating sufficient heat to interfere with proper movement of the clutch.

There is probably no class of machines which are started and stopped more often than presses, and when heavy presses are considered, it will be apparent that the work required of a clutch is enormous, and the friction developed by the brake must be substantial to control the movement. In such presses the heat generated by the brake is so great that after a short period of time the clutch is rendered useless unless some means is provided to cool it.

The primary object of this invention is to overcome the above objection and to produce a simple and improved clutch and brake arrangement for stamping and drawing presses which efficiently operates over an extended period of time without necessitating inspection, adjustment, repair or cooling. Other objects of the invention will appear as the description proceeds.

A cardinal feature of the invention consists in the arranging of the clutch parts of stamping and drawing presses in spaced relation from the braking elements on the same shaft and having the heavier parts of the clutch rotate continuously, and the lighter parts thereof intermittently start and stop. In this manner heating of the clutch parts is eliminated and the press is enabled to run smoothly and satisfactorily over an indefinite period.

Figure 1:
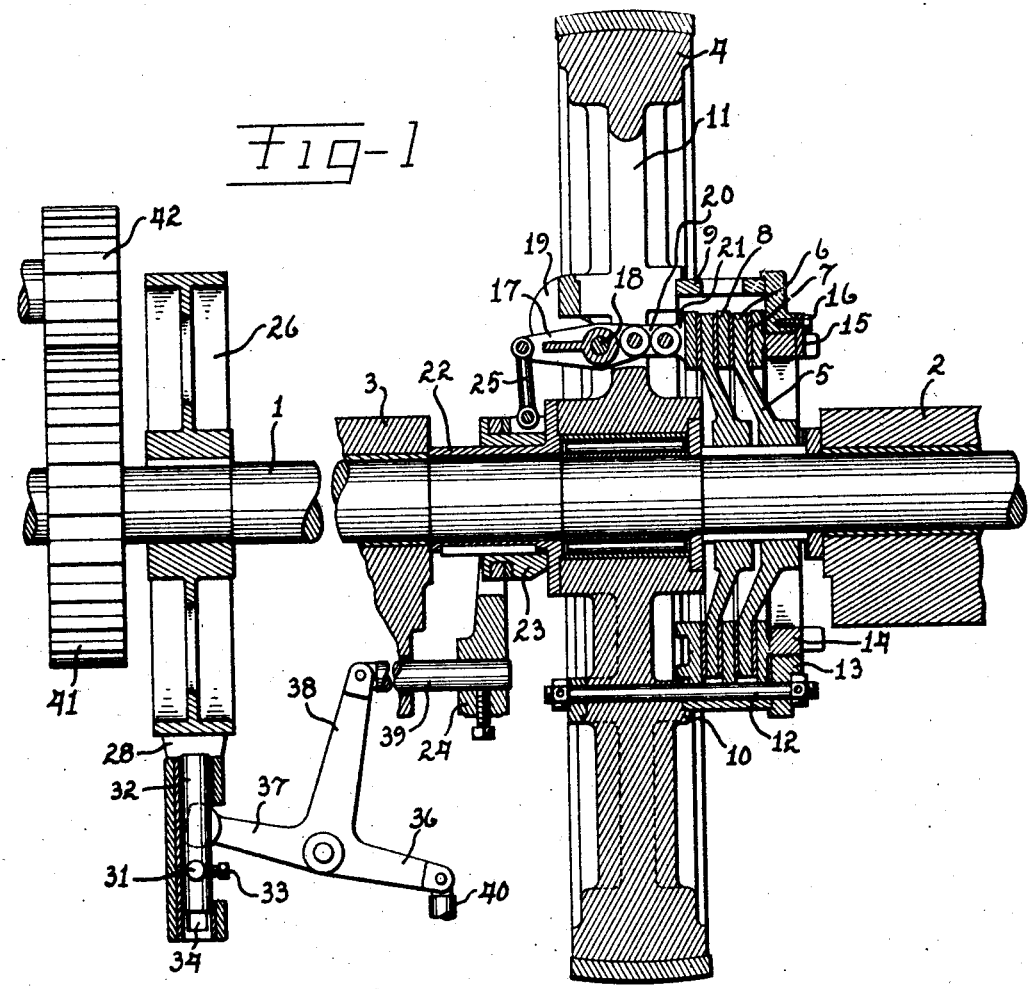
Figure 2:
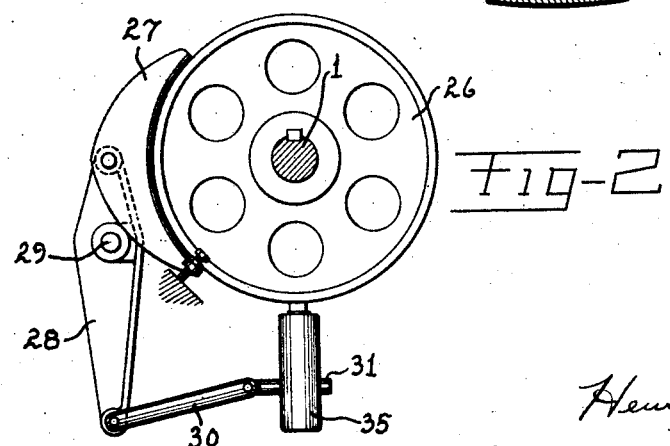

The invention is shown by way of illustration in the accompanying drawing, in which: Fig. 1 is a vertical sectional elevation of the shaft control mechanism; Fig. 2 is a sectional elevation of the brake drum and braking element.

The illustrated embodiment of the invention comprises a rotatable shaft 1 journaled in bearings 2 and 3 and on which is rotatable a fly wheel 4. The fly wheel is a relatively heavy part and is continuously rotated, being adapted to be driven by a belt and having a roller bearing on the shaft to permit a free turning thereof.

Clutch spiders 5 are keyed to the shaft 1 for sliding or floating movements on the shaft, and each is provided with an outer radially disposed clutch rim portion 6 which is faced at opposite sides with a suitable lining material 7. A plurality of discs 8 are interposed between the spider rims 7 and are connected to the fly wheel 4 for turning movements therewith and cooperate with the clutch rim portions of the spiders so that when the clutch discs are tightened thereagainst the fly wheel and shafts are caused to turn together. Enclosing the spider rims 6 and discs 8 is a housing or cylinder drum 9 seated on a boss 10 on the adjacent side of each spoke 11 of the fly wheel.

A plurality of bolts 12 project through aligned apertures in a collar 13 and boss 10 of the fly wheel for holding the parts in place, the collar 13 having its outer edge inwardly flanged over the edge of the housing member and receiving a sleeve 14, which is screw-threaded therein and is adapted to receive the outward thrust of the outer clutch disc 8. The axial length of the sleeve 14 is greater than that of the collar 13, and its outer edge is provided with one or more notches to receive locking fingers 15 secured to the side of the collar 13 by screw 16. The fingers 15 lock the sleeve 14 in the adjusted relation to the collar 13.

The control means for the clutch includes one or more levers 17 pivotally mounted at 18 on a bracket 19 extending from the fly wheel 4. The lever 17 is disposed lengthwise of the shaft 1, and the inner end is connected by a link 20 to a boss 21 on the inner side of the innermost clutch disc 8, the connection being such that when the lever and link are in substantially straightened relation, the discs 8 are caused to have clamping engagement with the rim portions of the spiders 6, and when the lever 17 is rocked from this position the innermost clutch disc 8 is moved inwardly to effect a release of the clutch parts.

A sleeve 22 is secured to the end of the hub of the fly wheel 4 adjacent to the outer end of the lever 17 forming an extension of such hub and providing a bearing on which a shaft collar 23 is feathered for limited axial movements. The collar 23 is axially shifted by engagement of a control lever 24 therewith in a well known manner, and a link connection 25 is provided between the collar 23 and outer end of the lever 17 so that shifting of the collar imparts clutch releasing and engaging movements to the lever. The sleeve 22 may be secured to the fly wheel 4 by screws, or in any other suitable manner.

Spaced longitudinally along the shaft 1 from the fly wheel 4 and clutch parts, is a brake drum 26 which is keyed to the shaft 1 for rotation therewith. A shoe 27 is engageable with the periphery of the brake drum 26 for stopping the rotation of the drum 26 and shaft 1 when the fly wheel 4 is released from the shaft 1. The shoe 27 is pivotally connected to a lever 28 fulcrumed at 29, and the opposite end of the lever 28 is connected by a link 30 to a pin 31, which is secured to a pin 32 by a set screw 33, and is slidable in opposed slots 34 in a housing member 35. It is apparent that movement of the pin 32 operates to move the brake shoe 27 into engagement with or away from the drum 26.

For concomitantly operating the clutch parts and brake mechanism, a T-shaped lever 36 has an arm 37 universally connected to the pin 32 and arm 38 connected by a rod 39 to the operating lever 24. The lever 36 may be connected by a rod 40 to a suitable operating handle.

In operation, it is apparent that by movement of the lever 36 in a counter clockwise direction (Fig. 1) the clutch is released, thereby disconnecting the fly wheel 4 from the shaft 1, and the brake shoe 27 is at the same time brought into engagement with the drum 26 for stopping rotation of the shaft 1. Movement of the lever 36 in the opposite direction operates to move the brake shoe 27 away from the drum 26, and so operate the clutch so as to connect the fly wheel 4 with the shaft 1 for driving a pinion 41 secured to the shaft 1. The pinion 41 may be connected to a gear 42 for operating the main crank shaft of the press, it being understood that the above described construction and arrangement is particularly intended for use in connection with the relatively heavy stamping and drawing presses.

From the above description it is apparent that the relatively heavy fly wheel 4 rotates continuously while the lighter parts start and stop in accordance with the operation of the press, thereby reducing the friction required to stop the parts and extending the life of the parts. Inasmuch as the brake is distinctly separated from the clutch parts, it is obvious that the objection inherent in former constructions resulting in overheating the clutch parts, is eliminated and the mechanism may operate satisfactorily over an indefinite period of time without inspection, repair or adjustment.

While the above described construction is the best form known to me at the present time, it is to be understood that numerous changes in details of construction and arrangement may be effected without departing from the spirit of the invention, especially as defined in the following claim.

What I claim as new and desire to secure by Letters Patent is:

In a stamping and drawing press, a rotatable shaft, a relatively heavy member rotatable on said shaft, a clutch spider mounted on said shaft for turning movements therewith, a clutch disc rotatable with said member and movable axially relative thereto to engage and release the spider, control means on the opposite side of said member extending through said member and engaging said clutch disc, means movable along said shaft for operating said control means, a brake drum rotatable with said shaft and spaced longitudinally thereon from said clutch parts, a braking member engageable with said drum, and common means to operate said clutch operating means and braking member.

In testimony whereof I have hereunto signed my name to this specification.

HENRY J. HINDE.